United States Patent [19]

Martinen et al.

[11] Patent Number: 4,610,014
[45] Date of Patent: Sep. 2, 1986

[54] GAS FLOW LASER

[75] Inventors: Hinrich Martinen, Quickborn; Samuel S. Simonsson; Peter Wirth, both of Winsen, all of Fed. Rep. of Germany

[73] Assignee: Rofin-Sinar Laser GmbH, Hamburg, Fed. Rep. of Germany

[21] Appl. No.: 575,226

[22] Filed: Jan. 30, 1984

[30] Foreign Application Priority Data

Feb. 15, 1983 [DE] Fed. Rep. of Germany ..... 33051526

[51] Int. Cl.⁴ ............................................... H01S 3/22
[52] U.S. Cl. ........................................ 372/59; 372/58; 372/55
[58] Field of Search ................... 378/55, 58, 59, 83

[56] References Cited

U.S. PATENT DOCUMENTS 3,970,957 7/1976 Regan ................................. 378/58
4,550,409 10/1985 Kaye ................................. 372/87

FOREIGN PATENT DOCUMENTS 3031692 4/1982 Fed. Rep. of Germany ........ 372/55
54-32694 9/1980 Japan .................................. 372/59

Primary Examiner—Leon Scott, Jr.
Attorney, Agent, or Firm—Prutzman, Kalb, Chilton & Alix

[57] ABSTRACT

Gas flow laser, in particular a laser through which the gas flows transversely, or through which it flow rapidly in an axial direction, which possesses a main gas circuit embracing the resonator and a circulating pump, together with an auxiliary circuit for continuously bleeding-off, conditioning and reintroducing a partial stream of the gas. The cost of the auxiliary circuit is reduced by connecting it to the main circuit upstream and downstream of the circulating pump, so that the full delivery head by the circulating pump is available for operating the auxiliary circuit. The supply of fresh gas can be introduced independently of the auxiliary circuit.

2 Claims, 1 Drawing Figure

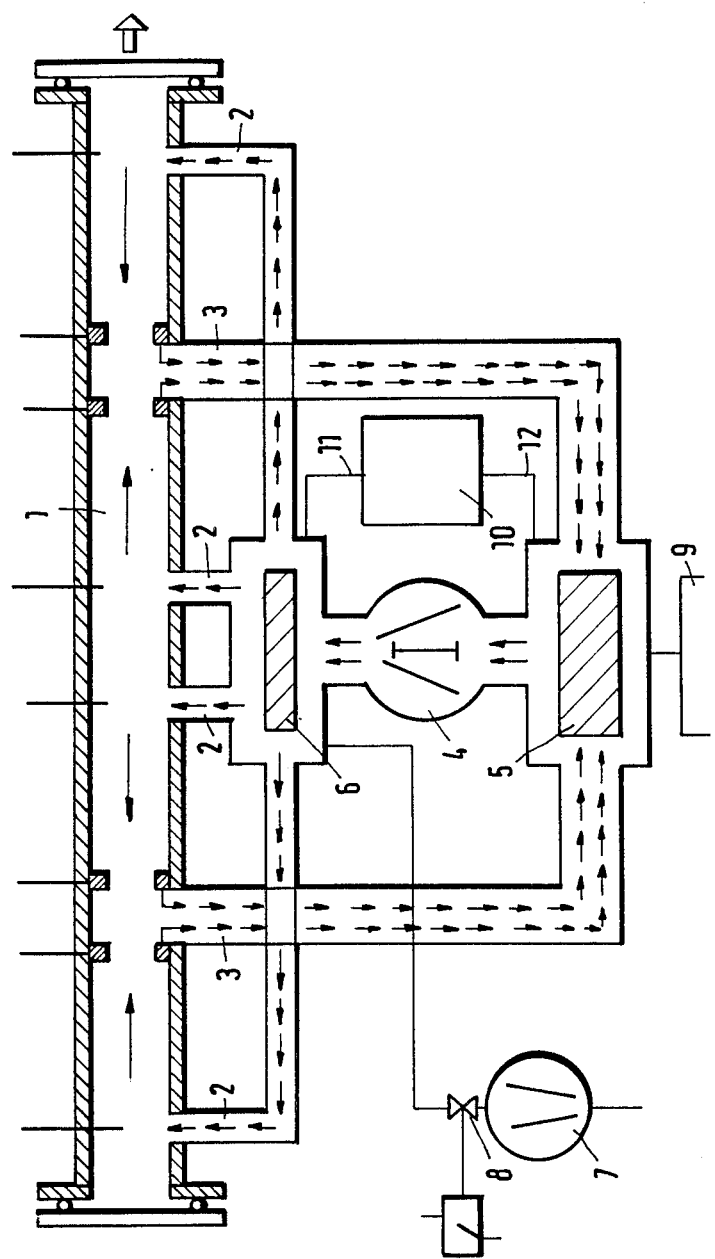

GAS FLOW LASER

DESCRIPTION

The invention relates to a gas flow laser, in particular a laser through which the gas flows transversely, or through which it flows rapidly in an axial direction, which possesses a main gas circuit embracing the resonator and a circulating pump, together with an auxiliary circuit for continuously bleeding-off, conditioning and reintroducing a partial stream of the gas.

It is known that the working gas of a gas laser requires continuous conditioning, because chemical changes occur in the discharge section, which produce impurities and hence lead to changes in the characteristics of the laser, and to a reduction in the efficiency. In the case of a $CO_2$ laser, employing a working gas which is composed predominantly of helium, with lesser proportions of carbon dioxide and nitrogen, the formation of, in particular, carbon monoxide, oxygen, and oxides of nitrogen occurs. Furthermore, it is necessary to eliminate foreign substances which can be drawn in from the surrounding atmosphere as a result of leaks in the system, in particular water vapor. It is known (British Pat. No. 1,449,056) to separate off the valuable helium constituent from the gas leaving the resonator, and to reintroduce it into the resonator following the admixture of appropriate amounts of carbon dioxide and nitrogen. However, this procedure is very expensive.

It is also known (British Pat. No. 1,256,398) to provide filters and catalyzers in the main circuit, which serve merely to remove the impurities. Irrespective of the fact that it is disadvantageous to treat the entire quantity of gas in the main circuit, the continuous determination of the composition of the working gas is very expensive, as is the correspondingly proportioned supply of various proportions of fresh gas. Accordingly, in cases involving high gas-flow rates, filtration of the gas and removal of the oxygen are, in many cases, accepted as sufficient, but this entails the necessity to tolerate increased proportions of CO and $H_2$ in the working gas (U.S. Pat. No. 4,316,157). Finally, it is known ("Laserfocus" December 1982, page 43) to employ a separate vacuum pump in order to draw off a portion of the working gas, continuously, into an auxiliary circuit, to condition this gas, to mix it with fresh gas in the necessary proportions, and to reintroduce it into the main gas circuit at the same point. Although, when this procedure is employed, the expense of conditioning is reduced insofar as the entire gas stream does not have to be led continuously through the conditioning devices, but the cost of circulating the gas in the auxiliary circuit, and of combining it with fresh gas over several pressure stages is very high.

The object underlying the invention is accordingly to provide a laser which is of the type initially mentioned, which is of simple construction, and which is accordingly less expensive and less prone to failure.

This object is achieved, according to the invention, when the auxiliary circuit, which is designed in a manner such that it contains no pump, is connected to the main circuit upstream and downstream of the circulating pump.

By means of this arrangement, the pressure difference which is required for the operation of the auxiliary circuit is derived from the circulating pump in the main circuit, this pump being present in any case. The separate combination of the conditioned gas with the fresh gas is dispensed with and, in contrast, assuming that the composition of the conditioned gas remains constant, or alters only slightly, the special measurement of the composition is abandoned, and the fresh gas is supplied in a composition which is always the same, the location at which it is supplied being unimportant. Instead of assuming that the gas composition does not change, it is also possible to make the assumption that the change in the composition of the gas always remains constant, the composition of the fresh gas, whose composition is always constant, being shifted, relative to the gas composition desired in the apparatus, in a manner such that it balances out the change.

The portion of the gas drawn off into the auxiliary circuit can be a minor portion less than 10%.

In the text which follows, the invention is explained in more detail, by reference to the drawing which, in one FIGURE, depicts a schematic circuit diagram.

The working gas is supplied to the resonator 1 at several points, via lines 2, and is withdrawn again through lines 3 which are located, in each case, at the mid-point between two supply lines. The resonator and the lines 2 and 3 form the main circuit, which is closed by the circulating pump 4. Heat exchangers 5 and 6 are connected upstream and downstream of this circulating pump 4.

The desired pressure in the resonator is maintained by means of a vacuum pump 7 with a regulating valve 8. Fresh gas can be supplied at 9, the choice of a feed point upstream of the circulating pump 4 ensuring that the fresh gas is thoroughly mixed with the used gas before being supplied to the resonator.

The devices for conditioning a partial stream of the gas are diagrammatically combined into the box 10. They comprise, in particular, a flow-metering valve, an oil and water filter, a heated catalyst section, a particle filter, and a flowmeter. They are connected to the main circuit via lines 11 and 12, directly on the pressure-side and suction side of the circulating pump 4. As a result, the entire pressure difference generated by the circulating pump becomes available for the auxiliary circuit 10. This pressure difference is sufficient when the laser in question is of a type through which the gas flows rapidly, involving a correspondingly high circulating power, and hence a large pressure difference at the circulating pump 4. This requirement is satisfied principally in the case of lasers through which the gas flows rapidly in an axial direction.

We claim:

1. A method of conditioning the working gas within a laser resonating chamber of a gas laser by withdrawing working gas from the chamber, circulating said withdrawn working gas through a gas conditioning circuit and then returning said withdrawn working gas to the chamber, comprising the steps of providing a main, working gas, temperature conditioning, circuit with first and second separate conductor sections connected to the chamber for conducting all of said withdrawn working gas to and from the chamber respectively and a third conductor section connected between said first and second conductor sections in series therewith, producing a pressure differential between said first and second conductor sections by pumping all of said withdrawn working gas through said third conductor section and thereby circulating working gas from the resonating chamber and sequentially through said second, third and first conductor sections of the main, temperature conditioning, circuit and back to the resonating chamber, conditioning in said main, temperature conditioning, circuit, the temperature of all of said withdrawn working gas as it is circulated from said resonating chamber through the main, temperature conditioning, circuit and back to the resonating chamber, providing an auxiliary working gas, composition conditioning, circuit having a fourth conductor section connected between said first and second conductor sections in parallel with said third conductor section and solely using said pressure differential to return to said second conductor section from said first conductor section and via said fourth conductor section, only a minor return portion of said withdrawn working gas pumped through said third conductor section from said second conductor section to said first conductor section and conditioning in said fourth conductor section, the composition of only said minor return portion of said withdrawn working gas as it returned through said fourth conductor section from said first conductor section to said second conductor section, said fourth conductor section being connected between said first and second conductor sections in parallel with said third conductor section so that all of said withdrawn working gas is conditioned by said temperature conditioning means and only said minor portion of said withdrawn working gas is conditioned by said composition conditioning means.

2. A method of conditioning the working gas within a laser resonating chamber of a gas laser by withdrawing working gas from the chamber, circulating said withdrawn working gas through a gas conditioning circuit and then returning said withdrawn working gas to the chamber, comprising the steps of providing a main, working gas, temperature conditioning, circuit having means in the main circuit for conditioning the temperature of the working gas conducted therethrough, conducting all of said withdrawn working gas through the main circuit, including conducting all of said withdrawn working gas from the chamber and through the temperature conditioning means and back to the chamber by pumping all of said withdrawn working gas through a pump conductor section of said main circuit connected in series with said temperature conditioning means, providing an auxiliary, working gas, composition conditioning, circuit having an auxiliary conductor section connected to said main circuit in parallel with said pump conductor section and solely using the pressure differential, produced by pumping all of said withdrawn working gas through said pump conductor section, to conduct through said auxiliary conductor section only a minor return portion of said withdrawn working gas pumped through said pump conductor section from an outlet side of said pump conductor section to an inlet side of said pump conductor section, and conditioning in said auxiliary conductor section, the composition of only said minor return portion of said withdrawn working gas as it is returned through said auxiliary conductor section from said outlet side to said inlet side of said pump conductor section, said auxiliary conductor section being connected in parallel with said pump conductor section so that all of said withdrawn working gas is conditioned by said temperature conditioning means and only said minor portion of said withdrawn working gas is conditioned by said composition conditioning means.

* * * * *